(12) United States Patent
Towfiq et al.

(10) Patent No.: US 9,983,364 B2
(45) Date of Patent: May 29, 2018

(54) INTERFEROMETRIC MEASUREMENT METHOD FOR ANGULAR MISALIGNMENT, FIBER CORE CONCENTRICITY AND END FACE POLISH ANGLE OF SINGLE FIBER CONNECTORS AND FERRULES

(71) Applicants: Farhad Towfiq, Oceanside, CA (US); Anton Korniienko, Kyiv (UA); Yurii Yenko, Kyiv (UA)

(72) Inventors: Farhad Towfiq, Oceanside, CA (US); Anton Korniienko, Kyiv (UA); Yurii Yenko, Kyiv (UA)

(73) Assignee: Sumix Corporation, Oceanside, CA (US)

( * ) Notice: Subject to any disclaimer, the term of this patent is extended or adjusted under 35 U.S.C. 154(b) by 202 days.

(21) Appl. No.: 14/811,876

(22) Filed: Jul. 29, 2015

(65) Prior Publication Data
US 2017/0030801 A1   Feb. 2, 2017

(51) Int. Cl.
*G02B 6/38* (2006.01)
*G01B 11/27* (2006.01)

(52) U.S. Cl.
CPC ............ *G02B 6/385* (2013.01); *G01B 11/272* (2013.01)

(58) Field of Classification Search
CPC .................................................. G01M 11/088
USPC ........................................................ 356/73.1
See application file for complete search history.

(56) References Cited

U.S. PATENT DOCUMENTS

| | | | | |
|---|---|---|---|---|
| 5,633,970 A | * | 5/1997 | Olson .................. | G02B 6/3812 385/147 |
| 6,275,643 B1 | * | 8/2001 | Bandy .................. | G02B 6/3877 385/140 |
| 2006/0245711 A1 | * | 11/2006 | Kobayashi ............ | G02B 6/381 385/134 |
| 2014/0063598 A1 | * | 3/2014 | Zhou .................... | G02B 6/3866 359/368 |
| 2015/0177097 A1 | * | 6/2015 | Clarke .................. | G01B 11/14 356/73.1 |

* cited by examiner

*Primary Examiner* — Tarifur Chowdhury
*Assistant Examiner* — Omar Nixon
(74) *Attorney, Agent, or Firm* — Loza & Loza, LLP; Heidi Eisenhut (57) ABSTRACT

An interferometric measurement method aims at calculating angular misalignment between fiber and ferrule axes for single fiber ferrules. The misalignment is measured by scanning side surface of reference fiber inserted into the ferrule and side surface of the ferrule. For single fiber connectors and ferrules, the method also aims at calculating fiber core concentricity and ferrule circularity and for single fiber connectors, end face angle of polish. The concentricity, the circularity and the angle of polish are measured by scanning side surface of the ferrule and end face of the connector or ferrule. Interferometric data from the side surfaces of the reference fiber and the ferrule, or from the end face of the connector or ferrule and the side surface of the ferrule, is gathered during one scanning session—either one simultaneous scan or several scans without moving or re-inserting the connector or ferrule.

10 Claims, 7 Drawing Sheets

Related Art

```
┌─────────────────────────────────────────────────────────────┐
│ Provide an interferometer, a special fixture for simultaneous│
│ scanning of single fiber ferrule and fiber from side, a single fiber│
│ ferrule with a fiber bore to be measured and a reference fiber│
└─────────────────────────────────────────────────────────────┘
                              ↓
┌─────────────────────────────────────────────────────────────┐
│ Prepare the reference fiber for measurements by stripping the fiber│
│ end from outer plastic coating                              │
└─────────────────────────────────────────────────────────────┘
                              ↓
┌─────────────────────────────────────────────────────────────┐
│ Insert the reference fiber with bare fiber end into the ferrule│
└─────────────────────────────────────────────────────────────┘
                              ↓
┌─────────────────────────────────────────────────────────────┐
│ Mount the fixture on the interferometer and insert the ferrule into│
│ the fixture                                                 │
└─────────────────────────────────────────────────────────────┘
                              ↓
┌─────────────────────────────────────────────────────────────┐
│ Focus the interferometer by obtaining fringe patterns on the ferrule│
│ side and on the bare fiber side                             │
└─────────────────────────────────────────────────────────────┘
                              ↓
┌─────────────────────────────────────────────────────────────┐
│ Obtain interferometric data from the ferrule side and from the bare│
│ fiber side                                                  │
└─────────────────────────────────────────────────────────────┘
                              ↓
┌─────────────────────────────────────────────────────────────┐
│ Calculate angle between the ferrule and the bare fiber representing│
│ the angle between the ferrule axis and fiber bore axis      │
└─────────────────────────────────────────────────────────────┘
```

INTERFEROMETRIC MEASUREMENT METHOD FOR ANGULAR MISALIGNMENT, FIBER CORE CONCENTRICITY AND END FACE POLISH ANGLE OF SINGLE FIBER CONNECTORS AND FERRULES

CROSS-REFERENCE TO RELATED APPLICATIONS

Not applicable.

BACKGROUND

Field of the Invention

The present invention relates to the field of measuring the geometry of single fiber optic connectors and ferrules by means of interferometric microscopes. More specifically, the invention relates to interferometric measurement of fiber core concentricity, angular misalignment between fiber and ferrule axes and end face polish angle.

Description of the Related Art

Manufacturers of fiber optic connectors seek ways to produce the connectors with low transmission loss and low back reflection. End faces of fiber optic connectors must satisfy certain criteria for effective fiber mating as required by the industry standards. They must be clean and their surface geometry must provide for good physical contact, low signal loss and back reflection.

As set by the industry standards, the performance of single fiber optic connection is determined by fiber core concentricity and angular alignment of the connectors being mated. FIG. 1A-1D demonstrate the parameters influencing the performance by two examples of low-loss and high-loss connections.

Figure 1A:
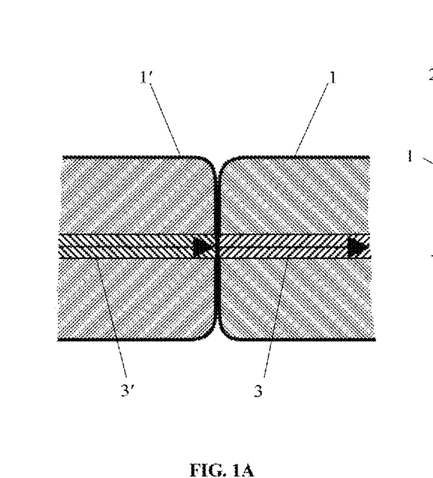
Figure 1B:
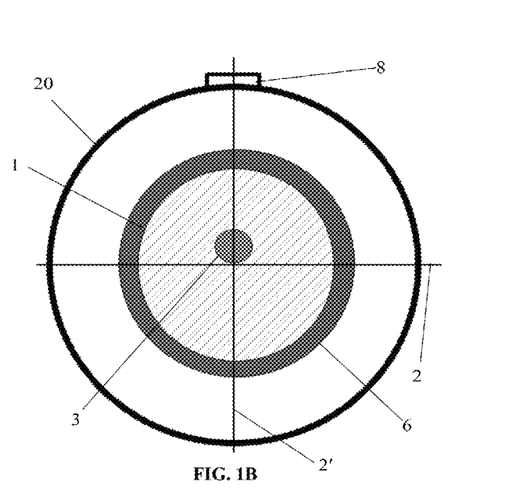

Good cable performance is presented on FIG. 1A and FIG. 1B. Fiber cores 3 and 3' are concentric and well aligned with claddings 1 and 1' in both mating connectors. FIG. 1A illustrates that optical signal propagates well between the connecting cables with no loss as shown by the horizontal arrows. FIG. 1B provides a cross-sectional view of a low-loss fiber optic connector 20 in which the cladding 1 is correctly aligned with the fiber bore 6. The fiber with the core 3 satisfies concentricity requirement relative to the connector key 8 with X and Y axes 2 and 2'.

Figure 1C:
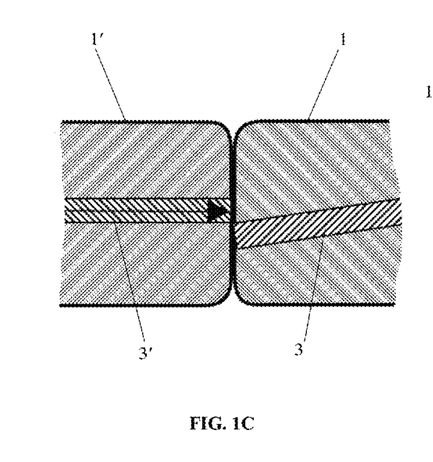
Figure 1D:
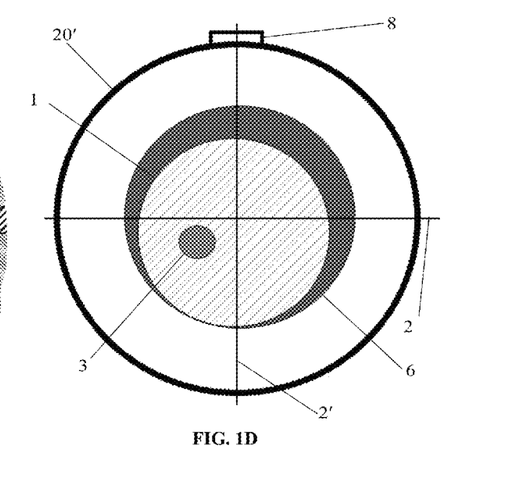

FIG. 1C demonstrates how signal is extinguished at the juncture because the fiber with the core 3 is not concentric and misaligned in the cladding 1. FIG. 1D demonstrates a cross-sectional view of the fiber optic connector 20' with low performance. The cladding 1 is misaligned in the fiber bore 6. The fiber with core 3 does not satisfy the concentricity requirement relative to the connector key 8 with X and Y axes 2 and 2'.

A method for measuring angular misalignment between the fiber and ferrule axes for fiber optic connectors with fiber installed is described in IEC 61-300-3-26 standard. According to the abovementioned method, the ferrule is placed in a V-groove and rotated. Displacement of the light beam that shines into the fiber core is detected by a microscope and a video camera for several angular positions of the ferrule.

Figure 2:
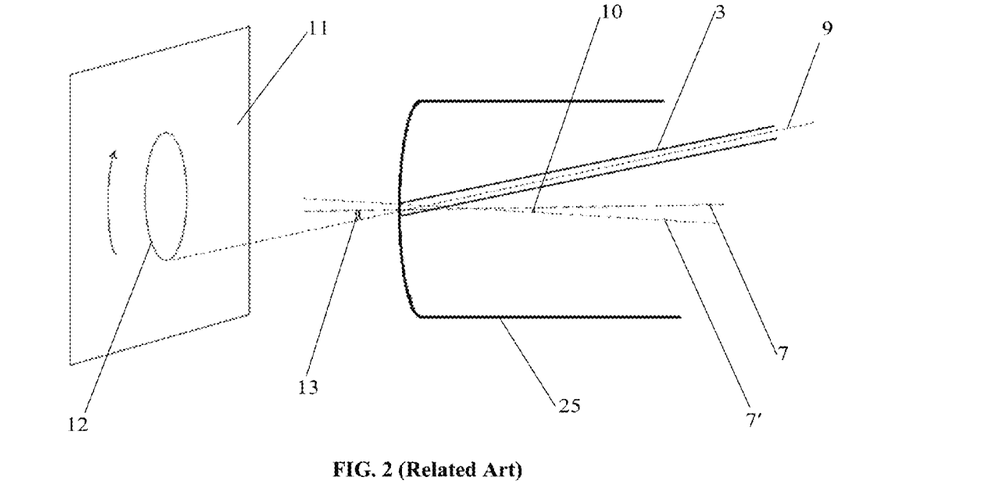
FIG. 2 demonstrates a related art problem with measuring angular misalignment between the fiber and ferrule axes.

The angular misalignment is measured as the deviation in the far field pattern coming from the fiber core (see FIG. 2). The reference number 25 designates zirconia ferrule with axis 7. The reference number 3 designates fiber core with Z axis 9. The movement of the light beam forms a circle 12 on the CCD target 11. The angle of misalignment 13 between the ferrule axis 7 and fiber axis 9 is calculated.

The disadvantage of the angular misalignment measurement method is that the rotation axis can deviate from the initial position that can influence the accuracy of results. This is illustrated on FIG. 2 by a deviation angle 10. The rotation axis in its initial position coincides with the ferrule axis 7 and then shifts to the position 7'.

There are also other known methods for measuring the angular misalignment of fiber optic connector components. For example, in U.S. Pat. No. 6,918,269 B2 Hua-Kuan Wang, P., (2005) it is suggested to rotate an optical fiber or a device about three axes so that rotation of the fiber does not cause a translation of the end of the fiber. The rotation is made until maximum signal is achieved with another optical device. Additional equipment is required for such rotation.

For measuring the angular misalignment between the fiber bore and the ferrule axes, the present invention suggests inserting a reference fiber into the fiber bore. Then this inserted fiber and the ferrule are scanned from side by an interferometric microscope and their 3D positions are determined. It is possible to calculate relative angle between the ferrule and fiber bore axes. There is no need in rotation in such method and it is simpler and requires no additional equipment beside an interferometer used for conventional end face testing.

It should be understood that the rotation of the ferrule can be applied in the present method to improve the accuracy of calculation. The deviation of the rotation axis does not affect the accuracy of results because the present method allows determining 3D position of the axis for each angular position.

A method for measuring the fiber core concentricity of ferrules with fiber bores and of ferrules with fiber installed is described in the standard IEC 61-300-3-25. According to the abovementioned method, the ferrule is placed in a V-groove and rotated. Displacement of the light beam that shines into the fiber core is detected by a microscope and a video camera for several angular positions of the ferrule.

Figure 3:
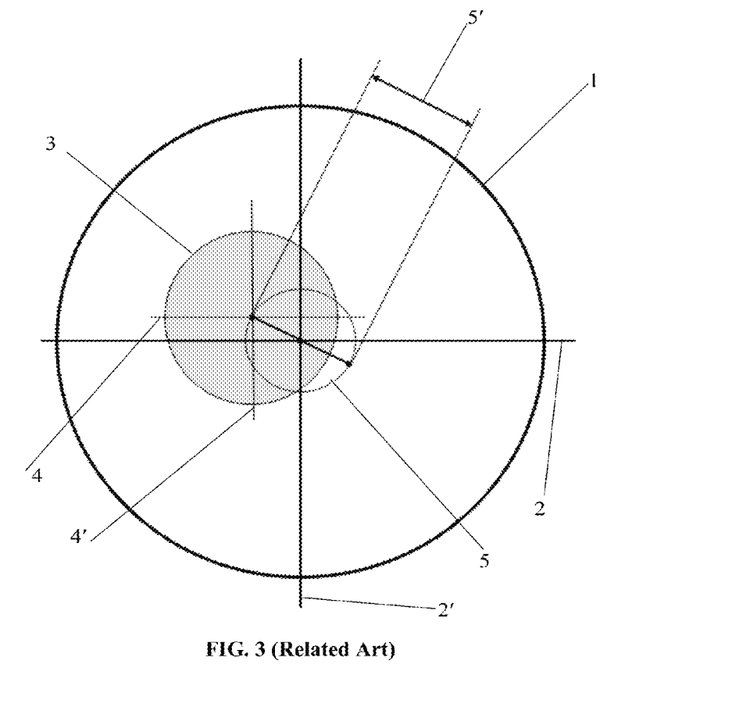
FIG. 3 demonstrates a related art problem with measuring fiber core concentricity.

The fiber core concentricity is calculated as diameter of a circle created by the movement of fiber core center (see FIG. 3). The reference number 1 designates a cladding with X and Y axes 2 and 2' respectively. The cladding contains a fiber with a core 3 with X and Y axes 4 and 4' respectively.

When the ferrule is rotated in the V-groove, the fiber core trajectory forms a circle 5. The fiber core concentricity is defined by the circle diameter 5'.

There are also other known methods for measuring the fiber core concentricity. For example, in U.S. Pat. No. 6,421,118 B1 Shaar, C., (2002) it is suggested to image fiber end face on a detector and measure the location of the center of the core relative to the image of the center of the cladding for three angular positions. The object is being rotated about the axis of rotation to take its three angular positions. The concentricity is calculated using the three measured figures.

U.S. Pat. No. 5,367,372 A DiVita P., (1994) suggests measuring geometric characteristics of nominally cylindrical guiding structures. Both eccentricity of the internal element and non-circularity of the external surface are measured by detecting a curve during rotation similarly to the method described in the standard IEC 61-300-3-25.

The disadvantage of both the method described in IEC 61-300-3-25 and the methods presented in the above stated patents is that the rotation axis can deviate from its initial position and influence the accuracy of results.

The present invention suggests measuring the fiber core concentricity and the ferrule circularity of single fiber connectors by simultaneous or subsequent scanning of the zirconia ferrule side surface and the connector or ferrule end face. The ferrule core center location and location of the end point on the ferrule is determined for several angular positions. Although the connector is being rotated, the deviation of the rotation axis from its initial position has no influence on the accuracy of measurement. The reason is that a relative position of the end point on the ferrule and the fiber core center is always determined.

Figure 4:
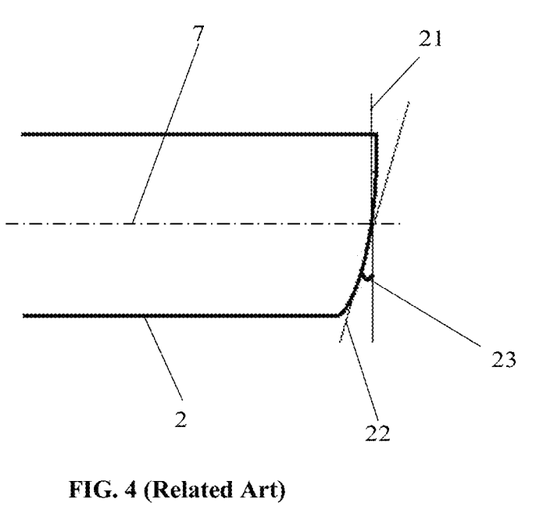
FIG. 4 demonstrates a related art problem with measuring end face polish angle.

The measurement method introduced in the present invention also allows increasing precision of measuring ferrule end face angle parameter. In IEC 61300-3-47 this parameter is defined as an angle between the plane perpendicular to the ferrule axis and a line tangent to the polished end face surface at the fiber center (see FIG. 4). The reference number 2 represents a zirconia ferrule with the axis 7. The plane 21 is perpendicular to the ferrule axis 7. The line 22 is tangent to the end face surface at the fiber center, and 23 is the end face polish angle.

The interferometric scanning of the ferrule side surface introduced in the present invention allows determining a precise 3D position of the ferrule axis. Thus, it allows to measure the end face polished angle with increased precision.

The present invention employs the same technique of measuring fiber optic connectors from side as described in related patent applications by the same inventor (see Towfiq, F., (2015) U.S. patent application Ser. No. 14/697,784 and Towfiq, F., (2015) U.S. patent application Ser. No. 14/744,314).

SUMMARY OF THE INVENTION

The main concept of the present method is obtaining interferometric data from side surfaces of single fiber connector components.

In the first exemplary embodiment a reference fiber is inserted into a fiber bore of single fiber ferrule. Then both the side surface of the reference fiber protruding from the bore and the side surface of the zirconia ferrule are scanned by an interferometer.

The first exemplary embodiment of the present invention aims at measuring the angular misalignment between the fiber and the ferrule axes of single fiber connectors. The measurement is performed by an interferometric microscope accompanied with special fixtures for side scanning.

The special fixtures enable simultaneous or subsequent obtaining interferometric fringe patterns on the side surfaces of the reference fiber and the zirconia ferrule. The special fixture used in the method of the first exemplary embodiment can contain mirror elements or prism elements that turn the images from the side faces of the reference fiber and zirconia ferrule and direct them into the interferometer.

The reference fiber which is inserted into the ferrule being measured has to have bare fiber end with length that insures the required accuracy of measurements. The length can vary from few microns to any larger length as permitted by the interferometric microscope field of view.

Alternatively to the fiber, another reference object can be used similar to the fiber by its geometrical dimensions and made of hard materials.

Interferometric fringe patterns are formed on the side surface of the bare fiber and on the side surface of the zirconia ferrule. The required misalignment angle between the ferrule and the fiber axes is calculated from the data obtained during the interferometric scanning.

In the second exemplary embodiment of the present method, both end face of a single fiber connector and side surface of the zirconia ferrule are scanned by an interferometric microscope.

The second embodiment of the present method aims at measuring the fiber core concentricity and ferrule end face angle. The measurement is performed by an interferometric microscope accompanied with special fixtures for simultaneous or subsequent end face and side scanning. The special fixture enables simultaneous or subsequent obtaining interferometric fringe patterns from the connector end face and from the side surface of the zirconia ferrule.

The special fixture used in the method of the second exemplary embodiment can contain mirror elements or prism elements that turn the images from the connector end face and the side faces of the zirconia ferrule and direct them into the interferometer.

For calculating the ferrule end face angle, precise location of the ferrule axis is determined based on the interferometric data from the ferrule side surface scanning. Then the ferrule end face angle is calculated using the data obtained from the interferometric scanning of the end face.

For measuring the fiber core concentricity, the connector is rotated several times so that the fiber center occupies several angular positions. The present patent uses four rotations, however it should be understood that it is possible to increase the number of rotations to improve the accuracy of measurements.

In the beginning of measurement the connector is inserted into the fixture and interferometric fringe pattern is formed on the side surface of the zirconia ferrule. Interferometric scanning is performed. An image of the connector end face is also obtained.

Then the connector is rotated around its axis in the fixture by some angle, for example, by 90 degrees, to occupy its second position. Interferometric fringe pattern is formed on the side surface of the zirconia ferrule. Interferometric scanning is performed. An image of the connector end face is also obtained.

The connector is rotated in the same way several more times to complete full 360 degrees rotation. For each position, interferometric fringe pattern is formed on the side surface of the zirconia ferrule. Interferometric scanning is performed. An image of the connector end face is obtained.

Based on the interferometric data and the ferrule end face image obtained for each position, it is possible to calculate relative deviation of the fiber or fiber bore center from its ideal position due to fiber core concentricity error and fiber circularity error.

The provided method of measuring the fiber core concentricity and the ferrule circularity can be used for single fiber ferrules with fiber absent. In this case, concentricity of the fiber bore center and the ferrule circularity are evaluated.

The present method in its first and second embodiments can be applied to single fiber ferrules and connectors of both PC and APC types. It can also be applied to any other types of ferrules and connectors which have cylindrical ferrules with single fiber holes. For example, it can be applied to SMA ferrules with single fiber holes in which multiple fibers are inserted. As reference objects for such ferrules reference fibers with larger diameter than in case of single fiber connectors can be used, either glass or steel. Any other suitable objects made of hard materials and fitting the fiber hole can be used as well.

BRIEF DESCRIPTION OF THE DRAWINGS

The presented method can be better understood with reference to the following drawings. Like reference numerals designate corresponding parts throughout several drawings.

FIG. 1A-1D demonstrate related art problem with signal loss in optical cable junctures by comparing high-quality and low-quality junctures. FIGS. 1A and 1C represent longitudinal sections of the junctures and FIGS. 1B and 1D are cross-sectional views.

| REFERENCE NUMERALS IN THE DRAWINGS | |
|---|---|
| 1, 1' single fiber connector claddings | 2, 2' connector axes X and Y |
| 3, 3' fiber cores | 4, 4' fiber core axes X and Y |
| 5 fiber core trajectory | 5' circle diameter |
| 7 fiber bore | 8 connector key |
| 9 fiber core Z axis | 10 deviation angle |
| 11 CCD target | 12 circle trajectory of the light beam |
| 13 misalignment angle | 14 interferometric microscope |
| 15 opening on the microscope front panel | 16 single fiber connector |
| 17 special fixture | 18, 18' mirror elements |
| 19, 19' mirror elements | 20 single fiber ferrule with reference ferrule inserted |
| 21 plane perpendicular to the ferrule axis | 22 line tangent to the end face surface at the fiber center |
| 23 end face polish angle | 24 viewport area |
| 25 mirror surface | |

DETAILED DESCRIPTION OF THE INVENTION

Reference will now be made in detail to the presented measurement method illustrated in the accompanying drawings.

Figure 5:
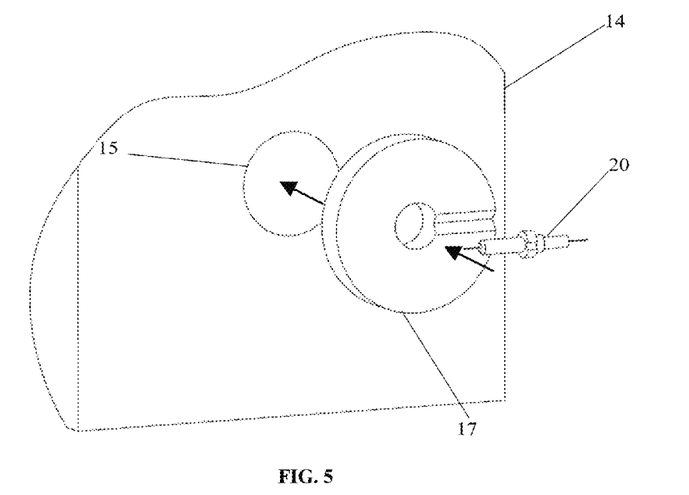
FIG. 5 shows a measurement system being prepared for testing.

FIG. 5 illustrates the first and second exemplary embodiments of the present invention. The reference number 14 represents an interferometric microscope. A special fixture 17 for simultaneous (or subsequent) measurements of the single fiber connector end face and the side surface of the ferrule or simultaneous (or subsequent) measurement of the reference fiber side surface and ferrule side surface is mounted on the microscope which has an opening 15 to receive the fixture. A single fiber ferrule with inserted fiber 21 or a single fiber connector 16 is inserted into the fixture for interferometric measurements.

Figure 6:
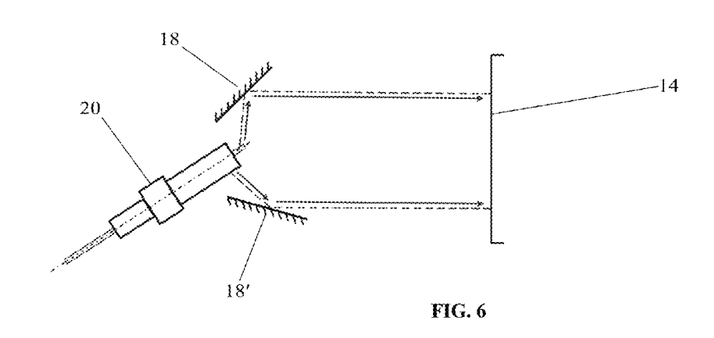
FIG. 6 and FIG. 7 demonstrate two different configurations of mirror elements in the special fixtures.
Figure 7:
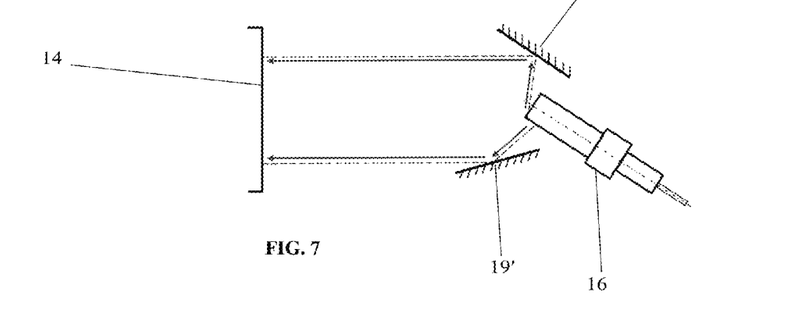

FIG. 6 and FIG. 7 provide side views of the mirror elements with which the special fixture 17 can be equipped. The mirrors 18 and 18' reflect the images from the side surfaces of the reference fiber inserted into the fiber bore of the ferrule 20, and from the ferrule side surface respectively, and direct the images into the interferometer 14 as illustrated by FIG. 6. Thus simultaneous or subsequent measurement of the reference fiber side surface and ferrule side surface is possible.

The mirrors 19 and 19' reflect the images from the single fiber connector end face and from the side surface of the zirconia ferrule which is part of the connector 16 respectively, and direct the images into the interferometer 14 as illustrated by FIG. 7. Thus simultaneous or subsequent measurement of the single fiber connector end face and the side surface of the zirconia ferrule is possible.

Figure 8:
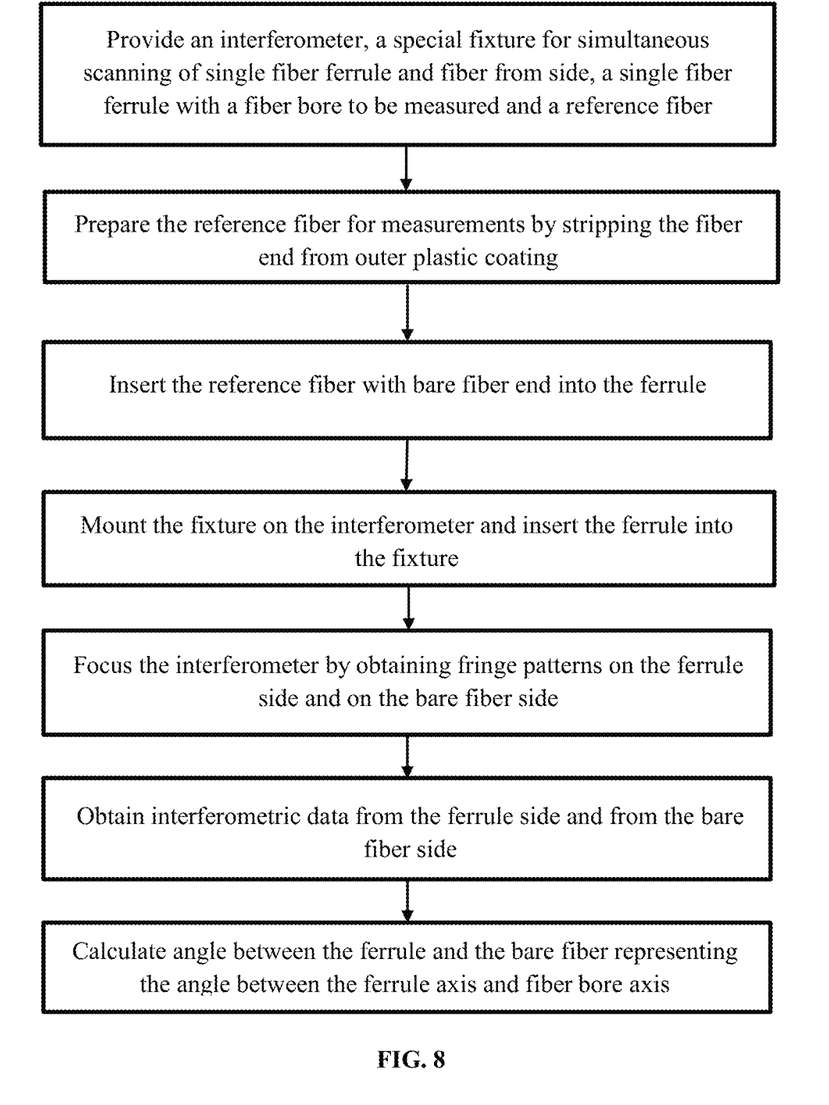
FIG. 8 is a flowchart of the measurement method in its first exemplary embodiment.

FIG. 8 represents a flowchart of the first exemplary embodiment method according to the present invention. The angle between the single fiber ferrule axis and the fiber bore axis is measured by an interferometric microscope. Special fixture for simultaneous or subsequent scanning of the side surfaces of the ferrule and the reference fiber is provided together with the microscope for positioning of the single fiber ferrule in the measurement system. The special fixture is mounted on the interferometric microscope and the ferrule is inserted into the fixture.

According to the proposed method, the ferrule is measured with inserted reference fiber with bare fiber end. The fiber ribbon is prepared for measurements before insertion. Fiber end in the reference fiber should be stripped from the outer coating so that the bare fiber end rises above the end face surface for the purpose of interferometric measurements. The length for which the bare fiber end should rise above the surface is limited by the interferometric microscope field of view, from few microns to any larger length.

After the ferrule is inserted into the special fixture and is ready for measurements, the interferometric microscope is focused and fringe patterns are created on the ferrule side surface and on the side surface of the reference fiber. Interferometric data is obtained from both side surfaces. This can be done either simultaneously or during several subsequent scanning sessions.

The 3D positions of the ferrule axis and the reference fiber axis are determined based on the interferometric data obtained during the scanning.

The final step is to calculate the angle between the ferrule axis and the bare fiber axis representing the angle between the ferrule axis and the fiber bore axis.

Figure 9:
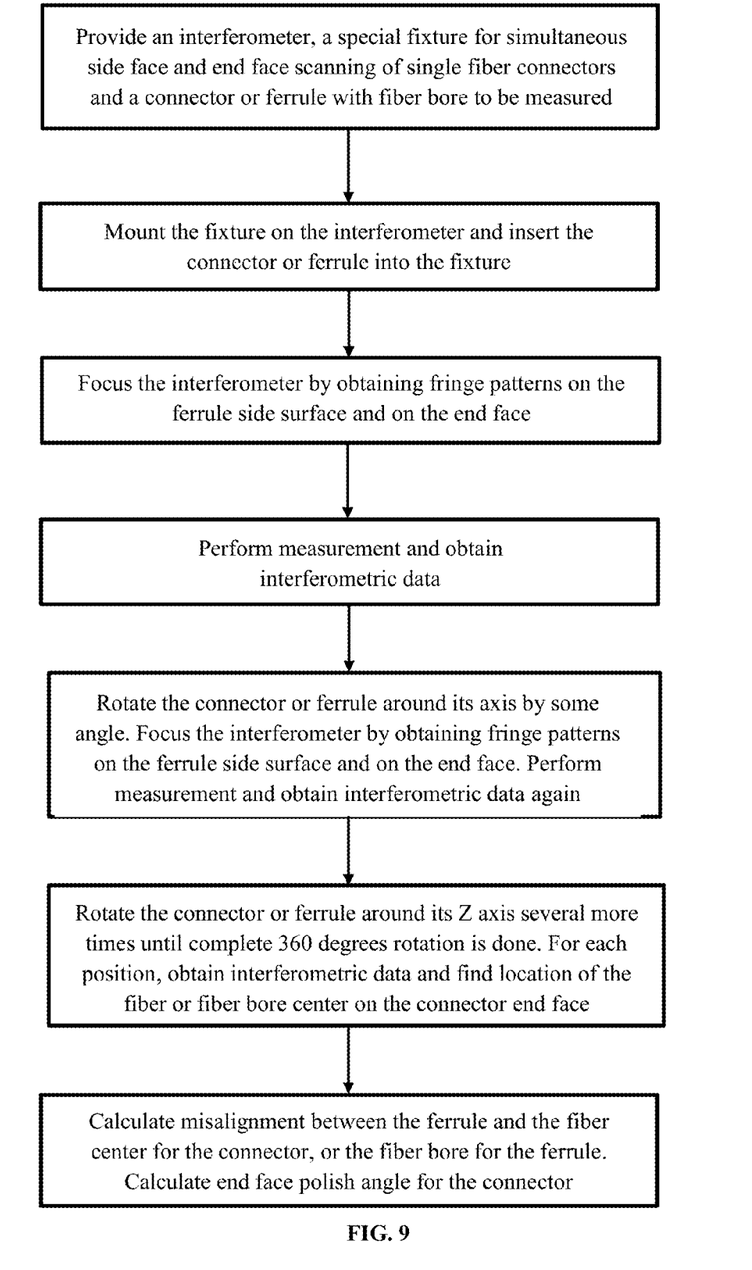
FIG. 9 is a flowchart of the measurement method in its second exemplary embodiment.

FIG. 9 represents a flowchart of the second exemplary embodiment method according to the present invention. The fiber core concentricity and the ferrule circularity for single fiber connector or single fiber ferrule with a fiber bore, as well as the end face angle of polish, are measured by an interferometric microscope. Special fixture for simultaneous or subsequent scanning of the connector or ferrule end face and side surface of the zirconia ferrule is provided together with the microscope for positioning of the connector or ferrule in the measurement system. The special fixture is mounted on the interferometric microscope and the connector or ferrule is inserted into the fixture.

After the connector or ferrule is inserted into the special fixture and is ready for measurements, the interferometric microscope is focused and fringe patterns are obtained on the side surface of the zirconia ferrule and on the end face of the connector or ferrule. Interferometric data is obtained from the side surface of the ferrule and from the end face of the connector or ferrule.

After the scanning session is finished for the first position of the connector or ferrule, it is rotated around its axes by some angle. The interferometer is focused once again if needed by obtaining fringe patterns on the side surface of the zirconia ferrule and on the end face of the connector or ferrule. Interferometric data is obtained from the side surface of the ferrule and from the end face of the connector or ferrule.

The connector or the ferrule is rotated around its axis several more times. The similar focusing is performed and interferometric data is obtained for each angular position of the connector or ferrule.

The final step is calculation of misalignment between the ferrule and the fiber for the connector, or the fiber bore for the ferrule. Such misalignment is caused by the fiber core or fiber bore concentricity error and ferrule circularity error. In case a single fiber connector is measured, 3D position of the ferrule axis is determined and the end face polish angle is calculated as well.

It should be understood that for single fiber connectors, only the concentricity parameter or only the end face polish angle can be calculated depending on the need.

Figure 10:
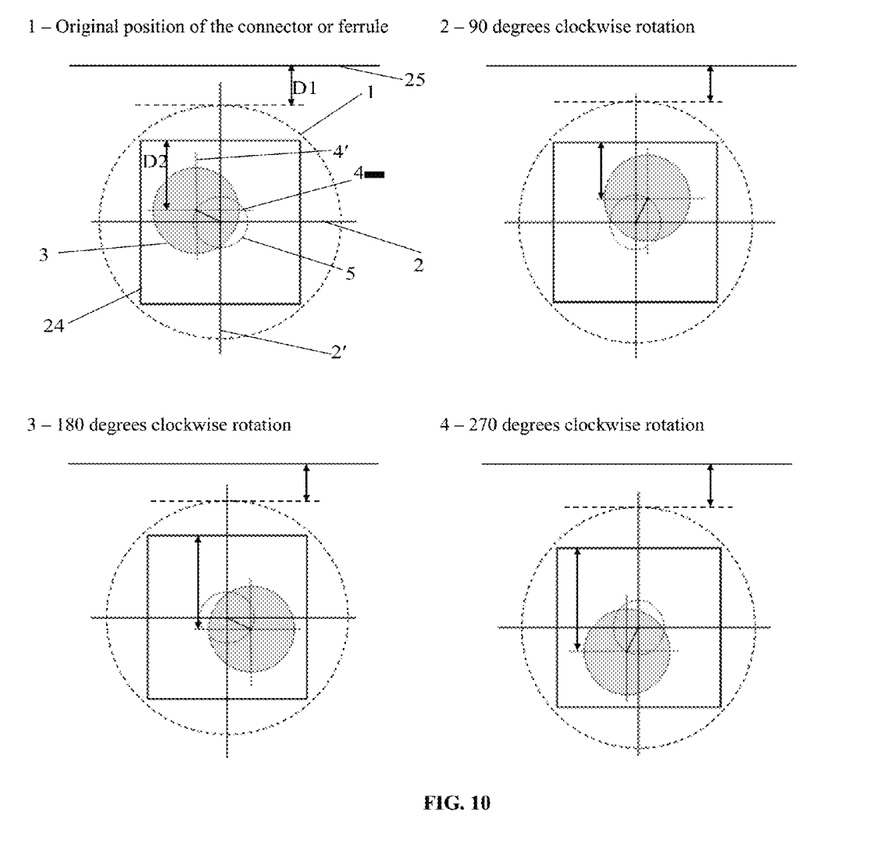
FIG. 10 illustrates the fiber core concentricity and ferrule circularity measurement.

FIG. 10 illustrates the fiber core concentricity and ferrule circularity measurement for 3 subsequent single fiber connector or ferrule rotations. It is shown that each time the connector or ferrule is rotated by 90 degrees clockwise around its axis. It should be understood that it can be rotated anticlockwise or by a different angle depending on the desired measurement accuracy.

The drawings in FIG. 10 represent a single fiber connector end face in four angular positions constituting complete 360 degrees rotation. The connector end face is similar to the drawing of FIG. 2 provided in the Related Art section. The drawing parts are the same for all four positions that is why part reference numbers are included for the first position only for simplicity of representation.

The reference number 1 designates a zirconia ferrule with X and Y axes 2 and 2' respectively. During interferometric scanning, the data is obtained from a part of the end face only limited by the rectangular viewport area 24. That is why the ferrule edge is shown by dotted lines as not visible. The position of the viewport area 24 remains unchanged for each angular position of the connector.

The ferrule contains a fiber with a core 3 with X and Y axes 4 and 4' respectively. When the ferrule is rotated in the V-groove, the fiber trajectory forms a circle 5. The fiber core concentricity is defined by the circle radius.

Interferometric data obtained from the ferrule side surface during the measurement for each angular position allows determining the distance D1 from a fixed reference plane 25 to the ferrule edge. The position of the reference plane 25 remains unchanged for each angular position of the connector. It is also possible to determine the distance D2 from the fiber or fiber bore center to the upper horizontal edge of the viewport 24.

Knowing D1 and D2 for each angular position, it is possible to calculate the relative deviation of the fiber or fiber bore center from its ideal position due to fiber core concentricity error and fiber circularity error.

We claim:

1. A method for interferometric measurement of angular misalignment between fiber and ferrule axes for single fiber optic ferrules with fiber absent, the method comprising:
    obtaining interferometric data from a zirconia ferrule and from a reference fiber inserted into a fiber bore of the ferrule by scanning the ferrule side surface and the reference fiber side surface by an interferometric microscope, wherein the reference fiber side surface is parallel to a Z axis of the reference fiber;
    calculating misalignment angle between the fiber and the ferrule axes based on the interferometric data obtained from both the ferrule side surface and the reference fiber side surface.

2. The method of claim 1 wherein the ferrule being measured is positioned in the interferometric system using a special fixture that enables simultaneous or subsequent scanning of the zirconia ferrule side surface and of the reference fiber side surface.

3. The method of claim 1 wherein the connector or ferrule being measured is positioned in the interferometric system using a special fixture that enables simultaneous or subsequent scanning of the zirconia ferrule side surface and of the reference fiber side surface by means of mirror elements that turn images from the side faces of the zirconia ferrule and of the reference fiber and direct them into the interferometric microscope.

4. The method of claim 1 wherein the reference fiber is any reference object similar to a conventional fiber with bare end by its geometrical dimensions with length as permitted by the interferometric microscope field of view and made of hard material such that this object will not deform by its own weight.

5. A method for interferometric measurement of fiber core concentricity and ferrule circularity of single fiber connectors and ferrules with fiber bores, the method comprising:
    obtaining interferometric data from a side surface of the zirconia ferrule and from an end face of the zirconia ferrule for several angular positions of the ferrule by rotating it around its Z axis, wherein the interferometric data is obtained by focusing an interferometric microscope on both the side surface of the zirconia ferrule and the end face of the zirconia ferrule for each of the several positions and obtaining resulting fringe patterns at each of the several positions;
    calculating lateral misalignment between the ferrule and the fiber center for the connector, or a fiber bore for the ferrule, caused by the fiber core concentricity error and the ferrule circularity error based on the obtained interferometric data.

6. The method of claim 5 wherein the connector or ferrule being measured is positioned in an interferometric system including the interferometric microscope using a special fixture that enables simultaneous or subsequent scanning of the zirconia ferrule side surface and the ferrule end face.

7. The method of claim 5 wherein the connector or ferrule being measured is positioned in an interferometric system using a special fixture that enables simultaneous or subsequent scanning of the zirconia ferrule side surface and of ferrule end face by means of mirror elements that turn images from the connector end face and the zirconia ferrule side faces and direct them into the interferometric microscope.

8. A method for interferometric measurement of an end face polish angle of single fiber connectors, the method comprising:
   obtaining interferometric data from a side surface of the single fiber connector and from an end face of the single fiber connector using an interferometric microscope, wherein the interferometric data is obtained by focusing an interferometric microscope on both the side surface of the zirconia ferrule and the end face of the zirconia ferrule for each of the several positions and obtaining resulting fringe patterns at each of the several positions;
   determining a three dimensional (3D) position of connector Z axis;
   calculating an end face polish angle for the single fiber connector based on the obtained interferometric data and the determined 3D position of the connector Z axis.

9. The method of claim 8 wherein the connector being measured is positioned in an interferometric system using a special fixture that enables simultaneous or subsequent scanning of the zirconia ferrule side surface and of the connector end face.

10. The method of claim 8 wherein the connector being measured is positioned in an interferometric system using a special fixture that enables simultaneous or subsequent scanning of the zirconia ferrule side surface and of the connector end face by means of mirror elements that turn images from the connector end face and the zirconia ferrule side faces and direct them into the interferometric microscope.

* * * * *